US 12,456,007 B2

(12) United States Patent
Bravo

(10) Patent No.: US 12,456,007 B2
(45) Date of Patent: Oct. 28, 2025

(54) AUTOMATIC CURATION OF CHATS IN VIRTUAL REALITY

(71) Applicant: Kyndryl, Inc., New York, NY (US)

(72) Inventor: Cesar Bravo, Alajuela (CR)

(73) Assignee: Kyndryl, Inc., New York, NY (US)

( * ) Notice: Subject to any disclaimer, the term of this patent is extended or adjusted under 35 U.S.C. 154(b) by 305 days.

(21) Appl. No.: 18/186,249

(22) Filed: Mar. 20, 2023

(65) Prior Publication Data

US 2024/0323149 A1   Sep. 26, 2024

(51) Int. Cl.

| | | |
|---|---|---|
| G06F 21/00 | (2013.01) |
| G06F 21/55 | (2013.01) |
| G06F 21/60 | (2013.01) |
| G06F 21/62 | (2013.01) |
| G06F 21/64 | (2013.01) |
| G06F 40/20 | (2020.01) |
| G06F 40/30 | (2020.01) |
| H04L 51/02 | (2022.01) |
| H04L 51/04 | (2022.01) |
| H04L 51/212 | (2022.01) |

(52) U.S. Cl.
CPC ............ *G06F 40/20* (2020.01); *G06F 21/00* (2013.01); *G06F 21/554* (2013.01); *G06F 21/62* (2013.01); *G06F 40/30* (2020.01); *H04L 51/04* (2013.01); *H04L 51/212* (2022.05); *G06F 21/629* (2013.01); *H04L 51/02* (2013.01)

(58) Field of Classification Search
None
See application file for complete search history.

(56) References Cited

U.S. PATENT DOCUMENTS

| | | |
|---|---|---|
| 6,842,773 B1 | 1/2005 | Ralson et al. |
| 7,720,853 B1 | 5/2010 | Siegel et al. |
| 8,095,400 B2 | 1/2012 | Herde et al. |
| 8,356,352 B1* | 1/2013 | Wawda ............... G06F 21/53 726/22 |
| 8,554,835 B1 | 10/2013 | Williams |

(Continued)

FOREIGN PATENT DOCUMENTS

| | | |
|---|---|---|
| CN | 110798394 A | 2/2020 |
| CN | 113271480 A | 8/2021 |

(Continued)

OTHER PUBLICATIONS

Hannah Brown, Katherine Lee, Fatemehsadat Mireshghallah, Reza Shokri, Florian Tramèr; What Does it Mean for a Language Model to Preserve Privacy?; Feb. 14, 2022; https://arxiv.org/pdf/2202.05520 (Year: 2022).*

(Continued)

*Primary Examiner* — Richa Sonifrank
(74) *Attorney, Agent, or Firm* — CANTOR COLBURN LLP; Erik Swanson

(57) ABSTRACT

Embodiments relate to providing automatic curation of chats in virtual reality. A technique includes determining, using a machine learning model, that consecutive segmented messages combine to form a complete message, the consecutive segmented messages being from a virtual environment. The technique includes determining that the complete message violates a security rule and performing a security action that affects a display of the consecutive segmented messages forming the complete message.

17 Claims, 12 Drawing Sheets

(56) References Cited

U.S. PATENT DOCUMENTS

| | | | |
|---|---|---|---|
| 8,762,302 | B1 | 6/2014 | Spivack et al. |
| 9,576,253 | B2 | 2/2017 | Zaltzman et al. |
| 9,654,492 | B2 | 5/2017 | Maylor et al. |
| 9,807,049 | B2 | 10/2017 | Halliday et al. |
| 9,830,475 | B2 | 11/2017 | Khandelwal |
| 9,866,513 | B2 | 1/2018 | Halliday et al. |
| 10,021,059 | B1 | 7/2018 | Rao |
| 10,035,594 | B2 | 7/2018 | Myslinski |
| 10,303,762 | B2 | 5/2019 | Markman et al. |
| 10,567,450 | B1* | 2/2020 | Gopal .................. H04L 51/52 |
| 10,691,726 | B2 | 6/2020 | Rapaport et al. |
| 10,708,216 | B1 | 7/2020 | Rao |
| 10,880,322 | B1 | 12/2020 | Jakobsson et al. |
| 11,102,244 | B1 | 8/2021 | Jakobsson et al. |
| 11,272,023 | B1 | 3/2022 | Everitt, Jr. |
| 11,412,353 | B2 | 8/2022 | Williams et al. |
| 11,425,073 | B2 | 8/2022 | Jeyaraman et al. |
| 11,443,246 | B2 | 9/2022 | Gueye |
| 11,477,654 | B1 | 10/2022 | Kahn |
| 2005/0198124 | A1 | 9/2005 | McCarthy |
| 2007/0067297 | A1 | 3/2007 | Kublickis |
| 2007/0067405 | A1 | 3/2007 | Eliovson |
| 2008/0177841 | A1 | 7/2008 | Sinn et al. |
| 2010/0174813 | A1* | 7/2010 | Hildreth ............ G06Q 10/107 709/224 |
| 2011/0289574 | A1 | 11/2011 | Hull et al. |
| 2011/0307496 | A1 | 12/2011 | Jones et al. |
| 2012/0102064 | A1 | 4/2012 | Becker et al. |
| 2012/0254333 | A1 | 10/2012 | Chandramouli et al. |
| 2013/0091090 | A1 | 4/2013 | Spivack et al. |
| 2014/0250145 | A1 | 9/2014 | Jones et al. |
| 2014/0257953 | A1 | 9/2014 | Kaplan et al. |
| 2014/0278367 | A1 | 9/2014 | Markman et al. |
| 2015/0026604 | A1 | 1/2015 | Mulukuri et al. |
| 2015/0149153 | A1 | 5/2015 | Werth et al. |
| 2015/0254566 | A1 | 9/2015 | Chandramouli et al. |
| 2016/0044054 | A1 | 2/2016 | Stiansen et al. |
| 2016/0055236 | A1* | 2/2016 | Frank .................. G06F 40/35 707/748 |
| 2017/0142051 | A1 | 5/2017 | Spivack et al. |
| 2017/0180284 | A1 | 6/2017 | Smullen et al. |
| 2018/0012184 | A1 | 1/2018 | Shraim et al. |
| 2018/0241701 | A1 | 8/2018 | Miyajima |
| 2019/0349477 | A1 | 11/2019 | Kotak |
| 2020/0004611 | A1 | 1/2020 | Sarin |
| 2020/0067861 | A1* | 2/2020 | Leddy ................. G06F 21/6245 |
| 2020/0267165 | A1 | 8/2020 | Leliwa et al. |
| 2021/0243572 | A1* | 8/2021 | Baez .................... H04W 8/186 |
| 2022/0086158 | A1 | 3/2022 | Thirumavalavan |
| 2022/0132214 | A1 | 4/2022 | Felman |
| 2022/0292254 | A1* | 9/2022 | Chopdekar .......... H04L 51/216 |
| 2022/0292423 | A1 | 9/2022 | Ash et al. |
| 2022/0343250 | A1 | 10/2022 | Tremblay et al. |
| 2022/0353229 | A1* | 11/2022 | Yan ........................ H04L 51/04 |
| 2025/0028855 | A1* | 1/2025 | Rodriguez Bravo ........................ H04L 63/1466 |

FOREIGN PATENT DOCUMENTS

| | | |
|---|---|---|
| EP | 1222587 A2 | 7/2002 |
| JP | 2002117135 A | 4/2002 |
| KR | 20190101492 A | 8/2019 |
| KR | 102419906 B1 | 7/2022 |
| KR | 102429416 B1 | 8/2022 |
| KR | 102442136 B1 | 9/2022 |
| WO | 2001008020 A1 | 2/2001 |
| WO | 2012048347 A1 | 4/2012 |
| WO | 2012116241 A2 | 8/2012 |
| WO | 2012131430 A1 | 10/2012 |
| WO | 2012160567 A1 | 11/2012 |
| WO | 2017068817 A1 | 4/2017 |
| WO | 2018209254 A1 | 11/2018 |
| WO | 2019132731 A1 | 7/2019 |
| WO | 2019215714 A1 | 11/2019 |
| WO | 2020170112 A1 | 8/2020 |
| WO | 2021205240 A1 | 10/2021 |

OTHER PUBLICATIONS

Etienne Papegnies,Vincent Labatut,Richard Dufour,Georges Linares; Conversational Networks for Automatic Online Moderation; Jan. 31, 2019; URL: https://arxiv.org/pdf/1901.11281 (Year: 2019).*
Salim, "Dubai Metaverse Assembly announced for September, to showcase 'real' meetings in virtual world," Khaleej Times, Jul. 19, 2022, 3 pages.
Shepherd, "20 Essential Meta Statistics You Need To Know in 2023," Social Shepherd, Jan. 3, 2023, 11 pages.

* cited by examiner

AUTOMATIC CURATION OF CHATS IN VIRTUAL REALITY

BACKGROUND

The present invention generally relates to computer systems, and more specifically, to computer-implemented methods, computer systems, and computer program products configured and arranged to provide automatic curation of chats in virtual reality.

Virtual reality is a simulated experience that can employ tracking and three-dimensional (3D) near-eye displays to offer the user an immersive feel of a virtual world. Applications of virtual reality may include entertainment particularly video games, education, business, etc. Other distinct types of virtual reality technology include augmented reality and mixed reality, sometimes referred to as extended reality. Virtual reality systems can use virtual reality headsets to generate realistic images, sounds, and other sensations that simulate a user's physical presence in the virtual reality. Virtual reality equipment enables a user to look around the artificial world, move around in it, and interact with virtual features or items. The effect is commonly created by virtual reality headsets including, for example, a head-mounted display with a small screen in front of the eyes.

SUMMARY

Embodiments of the present invention are directed to computer-implemented methods for providing automatic curation of chats in virtual reality. A non-limiting computer-implemented method includes determining, using a machine learning model, that consecutive segmented messages combine to form a complete message, the consecutive segmented messages being from a virtual environment. The computer-implemented method includes determining that the complete message violates a security rule and performing a security action that affects a display of the consecutive segmented messages forming the complete message.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
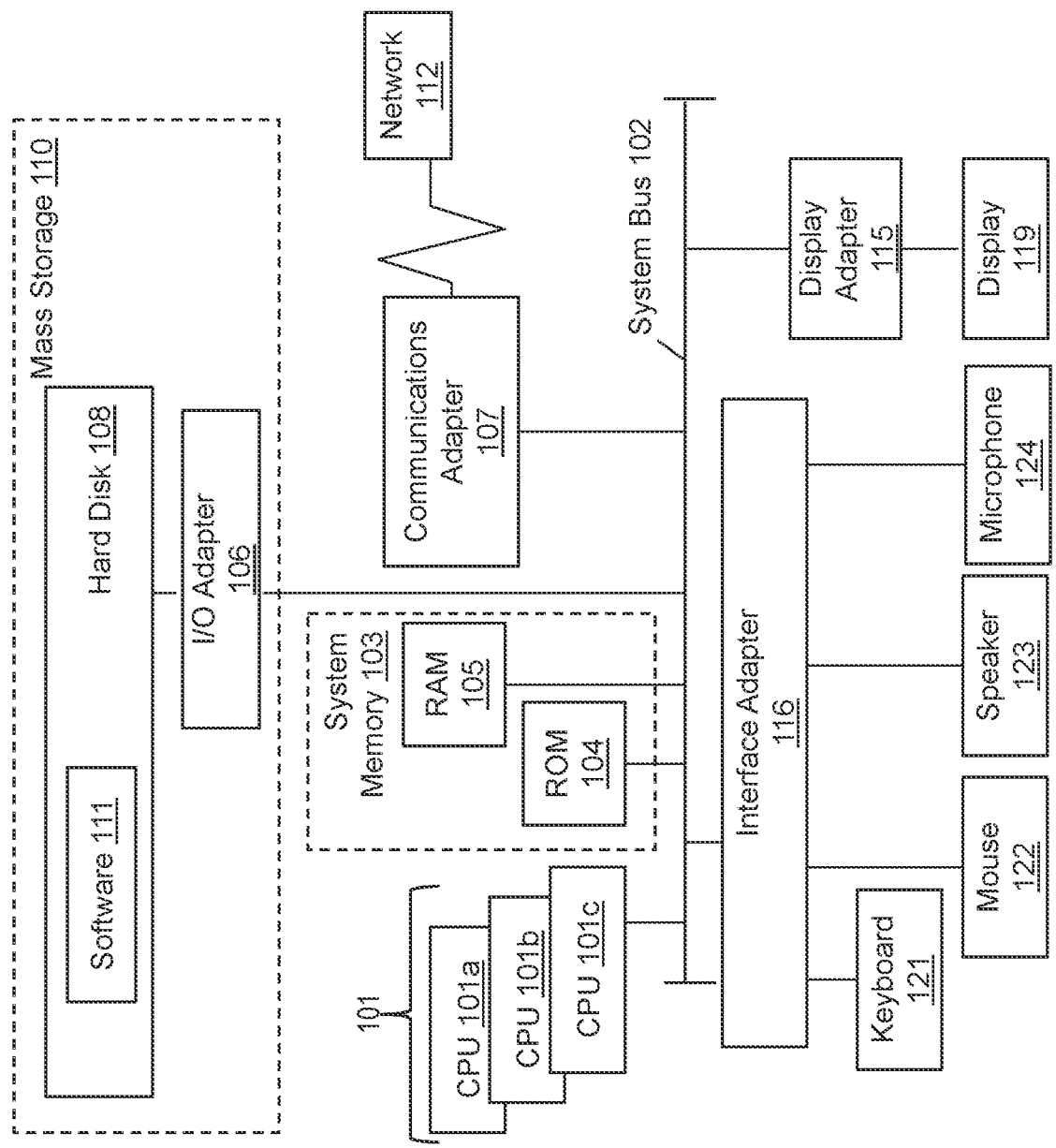
FIG. 1 depicts a block diagram of an example computer system for use in conjunction with one or more embodiments of the present invention.

One or more embodiments provide automatic curation of chats in virtual reality in order to determine a message that violates security rules and to automatically perform security actions based on the violation. According to one or more embodiments, a system is provided that uses a cognitive engine (e.g., a natural language processor) to determine when a condition is met in which a set of consecutive messages from a given user (or users) can be combined into a complete message intended to bypass current security features of the virtual reality. The system is configured to analyze consecutive messages from a user to determine when a condition is met in which the combination of messages violates any of the chat posting security rules. The system is configured to analyze consecutive messages from a multiple users, which may be represented by multiple user avatars, to determine when a condition is met in which the combination of messages violates any of the chat posting security rules. One or more embodiments provide a system that prevents the display of the chat message to other users in the virtual reality if any of the above conditions are met. In addition to preventing the display of the chat message in violation of the security rules, one or more embodiments are configured to provide a system that prevents the visualization of a user avatar (or user avatars) to other users if any of the conditions are met.

Virtual reality is the latest milestone in the digital evolution of social media and web interactions. A well-known virtual environment for virtual reality has 28.7 billion active users. Now, as can be imagined, a virtual environment with such a large number of users will have a lot of risks. One of those risks (which is already present on current virtual environment platforms) is about bad users called "Trolls", which are those users known to cause disruption to the user experience of other members through the abuse of features of the platform. A similar issue is present with bots whose aim is to provide unsolicited marketing to other users in virtual reality.

Technical solutions and benefits include a system that provides automatic curation of chats messages in virtual reality according to one or more embodiments. When the system detects that any of the conditions are met, the system is configured to implement a plurality of obfuscation techniques in order to protect the security in the virtual reality. In one or more embodiments, text obfuscation is utilized in which the system displays that the given user sent a message, but the content of the message is obfuscated. In one or more embodiments, the system is configured to prevent display of message such that the message is not displayed in the chat (i.e., no record of the message is identified in the chat). In one or more embodiments, the system is configured to provide user obfuscation in which the user avatar is not be visible to other users in addition to preventing display of any record of the message(s). Further, the system is configured to correlate if a given set of consecutive messages from different users are meant to bypass the security rules by dividing restricted content between users. If so, the system applies any of security actions discussed herein to all of the different users.

One or more embodiments described herein can utilize machine learning techniques to perform tasks, such as classifying a feature of interest. More specifically, one or more embodiments described herein can incorporate and utilize rule-based decision making and artificial intelligence (AI) reasoning to accomplish the various operations described herein, namely classifying a feature of interest. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," "a trained classifier," and/or "trained machine learning model") can be used for classifying a feature of interest, for example. In one or more embodiments, machine learning functionality can be implemented using an Artificial Neural Network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional Neural Networks (CNN) are a class of deep, feed-forward ANNs that are particularly useful at tasks such as, but not limited to analyzing visual imagery and natural language processing (NLP). Recurrent Neural Networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
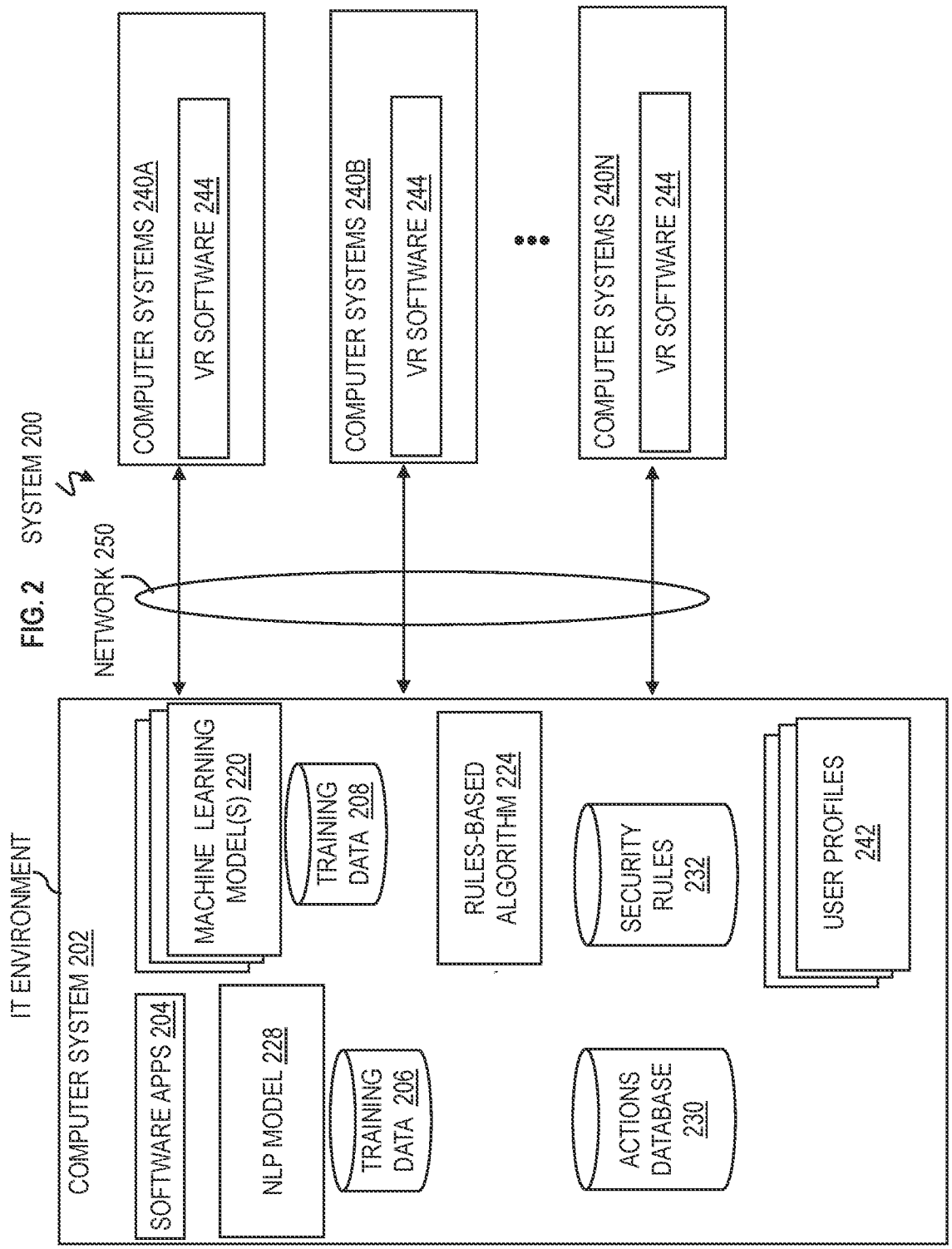
FIG. 2 depicts a block diagram of an example system configured to provide automatic curation of chats in virtual reality in order to determine a message that violates security rules and automatically perform security actions based on the violation according to one or more embodiments of the present invention.

FIG. 2 depicts a block diagram of an example system 200 configured for automatic curation of chats in virtual reality in order to determine a message that violates security rules and for automatically performing security actions based on the violation according to one or more embodiments. The system 200 includes a computer system 202 configured to communicate over a network 250 with many different computer systems, such as a computer system 240A for providing virtual reality to a user, a computer system 240B for providing virtual reality to a user, through a computer system 240N for providing virtual reality to a user. The computer systems 240A, 240B, through 240N can generally be referred to as computer systems 240 and are utilized to access the virtual reality offered by the computer system 202.

The computer systems 240 can be representative of any type of virtual reality equipment or device for experiencing a virtual environment, including a virtual reality headset. The computer systems 204 can include various software and hardware components, virtual reality software 244 for general virtual reality operations known by one of ordinary skill in the art. Although not shown for the sake of conciseness, the computer systems 240 can include one or more cameras, a microphone, a display, and other peripherals. The computer systems 240 can be coupled to a controller, such as a handheld controller. The computer system 202, computer systems 240, virtual reality software 244, software applications 204, machine learning models 220, rules-based algorithm 224, NLP model 228, etc., can include functionality and features of the computer system 100 in FIG. 1 including various hardware components and various software applications such as software 111 which can be executed as instructions on one or more processors 101 in order to perform actions according to one or more embodiments of the invention. The software application 204 can include, be integrated with, and/or call various other pieces of software, algorithms, application programming interfaces (APIs), etc., to operate as discussed herein. The software applications 204 may be representative of numerous software applications designed to work together. Each of the users of the computer systems 240A-240N have registered with registration and authentication software for a user account in order to utilize the virtual reality services provided by computer system 202, and each of the users has its own user account in its own user profile in user profiles 242. The user profile may record when the user account signs on and signs off the virtual reality, actions taken in virtual reality, etc. The software applications 204 can access and/or include the registration and authentication software in order to control access of the user accounts in user profiles 242 for users. The software applications 204 can perform actions and/or cause any actions to be performed for any of the user accounts in the user profiles 242 when the user accounts are determined to violate security rules as discussed herein.

The computer system 202 may be representative of numerous computer systems and/or distributed computer systems configured to provide virtual reality services to users of the computer systems 240. The computer system 202 can be part of a cloud computing environment such as a cloud computing environment 50 depicted in FIG. 11, as discussed further herein. The network 250 can be a wired and/or wireless communication network.

Figure 3:
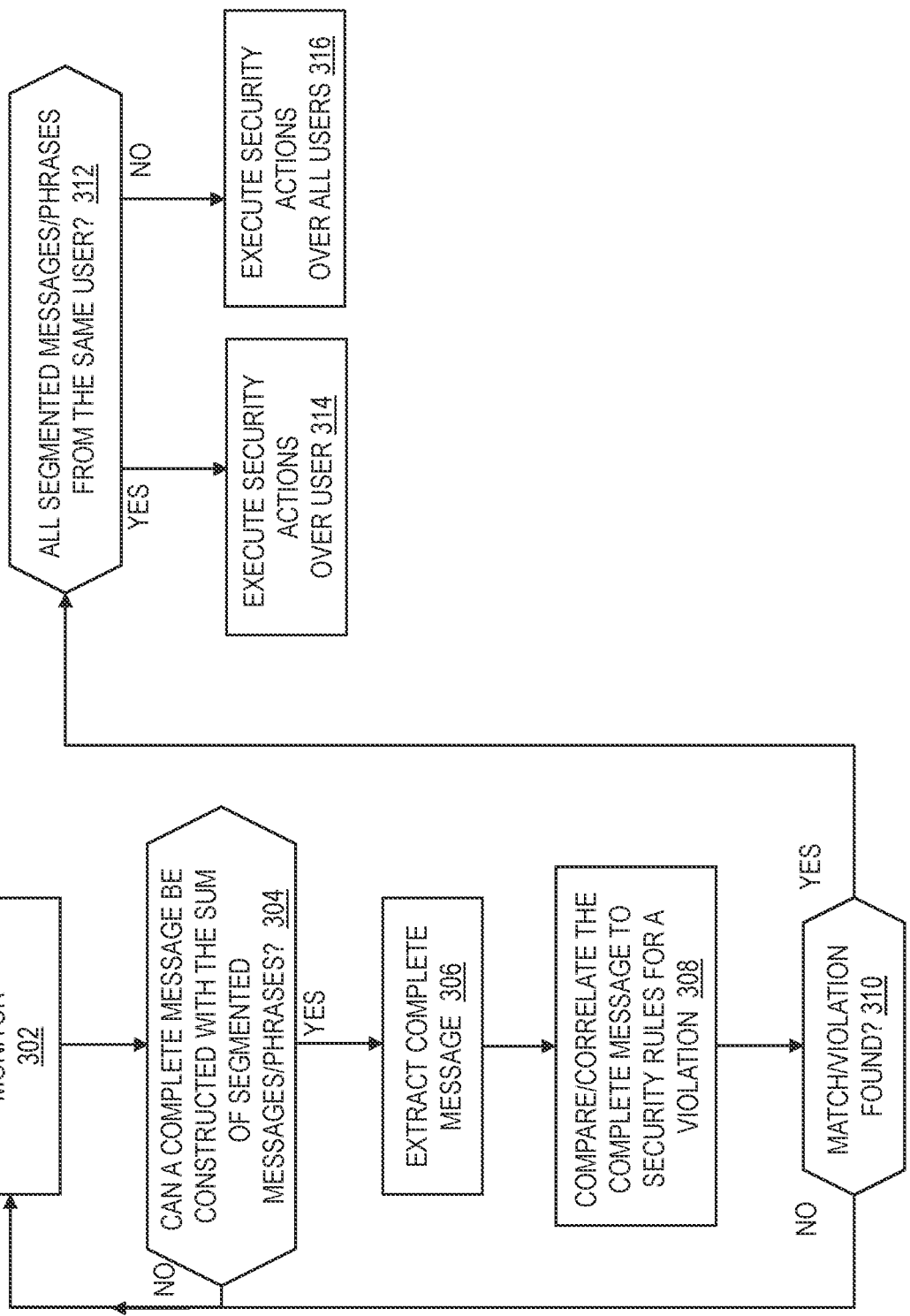
FIG. 3 is a flowchart of a computer-implemented method for automatic curation of chats in virtual reality in order to determine a message that violates security rules and for automatically performing security actions based on the violation according to one or more embodiments of the present invention.

FIG. 3 is a flowchart of a computer-implemented method 300 for automatic curation of chats in virtual reality in order to determine a message that violates security rules and for automatically performing security actions based on the violation according to one or more embodiments. The computer-implemented method 300 is executed by the computer system 202.

Figure 4:
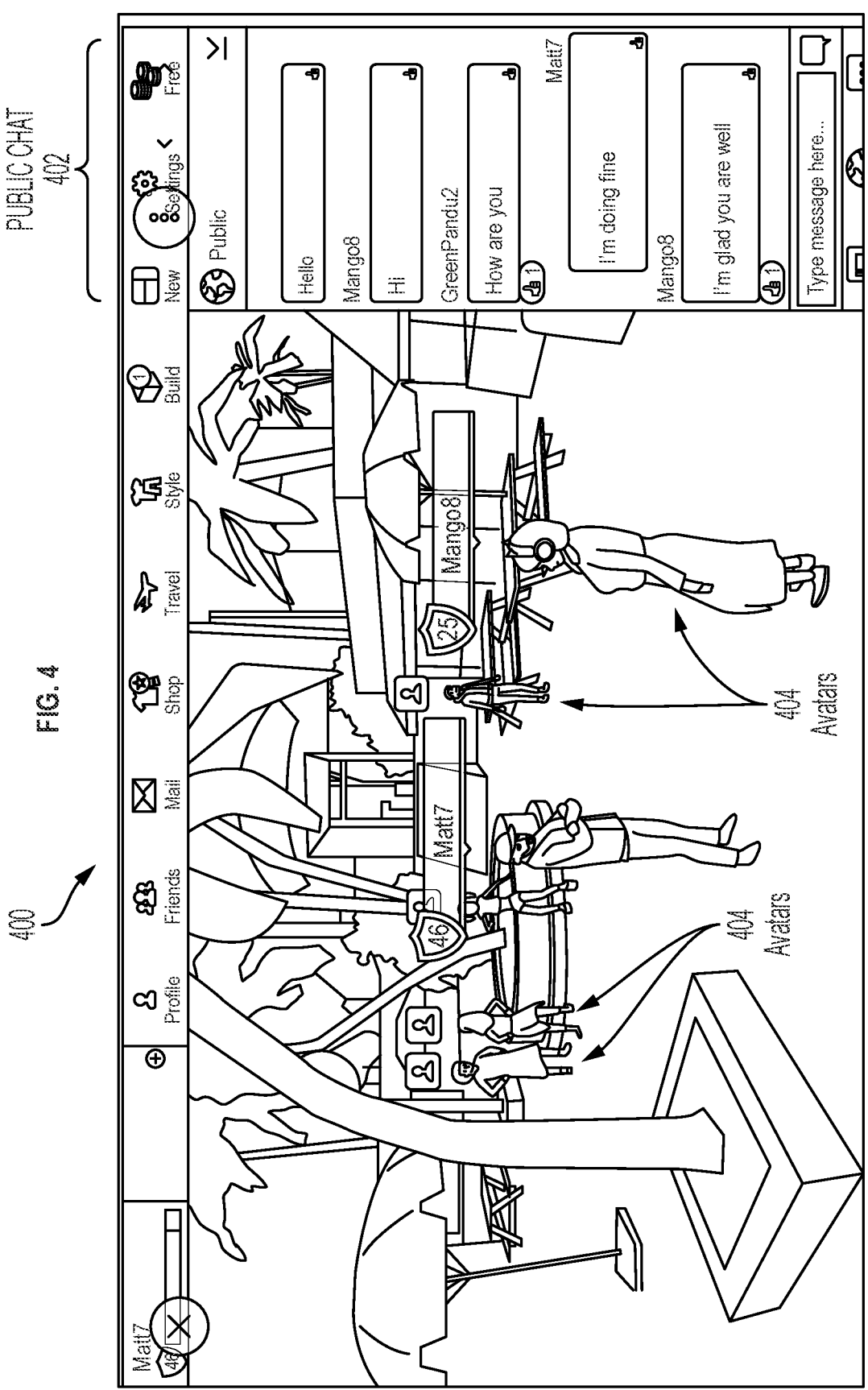
FIG. 4 depicts an example virtual environment in virtual reality with a global or public chat according to one or more embodiments of the present invention.

At block 302 of the computer-implemented method 300, one or more software applications 204 of computer system 202 are configured to monitor a public chat 402 in a virtual environment 400 depicted in FIG. 4. The software application 204 can include, employ, and/or call a monitoring engine that is configured to parse message in the public chat 402. In the virtual environment 400, a user can send messages to all or many users in the public chat 402 in the right panel. FIG. 4 depicts an example virtual environment 400 in virtual reality with the global or public chat 402 for any user avatar to communicate with other user avatars in a public forum. Example user avatars 404 are illustrated in a virtual world in the virtual environment 400 of FIG. 4. The user avatars 404 of users can freely maneuver and interact with objects in the virtual environment.

The problem is that "Trolls" can abuse this functionality and render the public chat useless by sending a lot of messages, for example, sending 100 messages with the same word or phrase. This will render the public chat useless because valid chats from other users will be lost in that sea of messages. Additionally, a problem with bots is that the bots enter the public chat and cause disruption, for example, mostly in terms of unwanted advertisements, marketing, and solicitations. Further, these bots can saturate the public chat with advertisements, marketing, and solicitations and render groups chats useless. Current solutions are based on chat static rules like block repetitive messages, block messages above a posting threshold, and even block a message based on its content. However, the blocking of a message based on content is performed based on a single message for a single user. This limitation is the one that is being exploited by adverse users to bypass current security systems, which can abuse global or public chats and render them inoperable.

Figure 5:
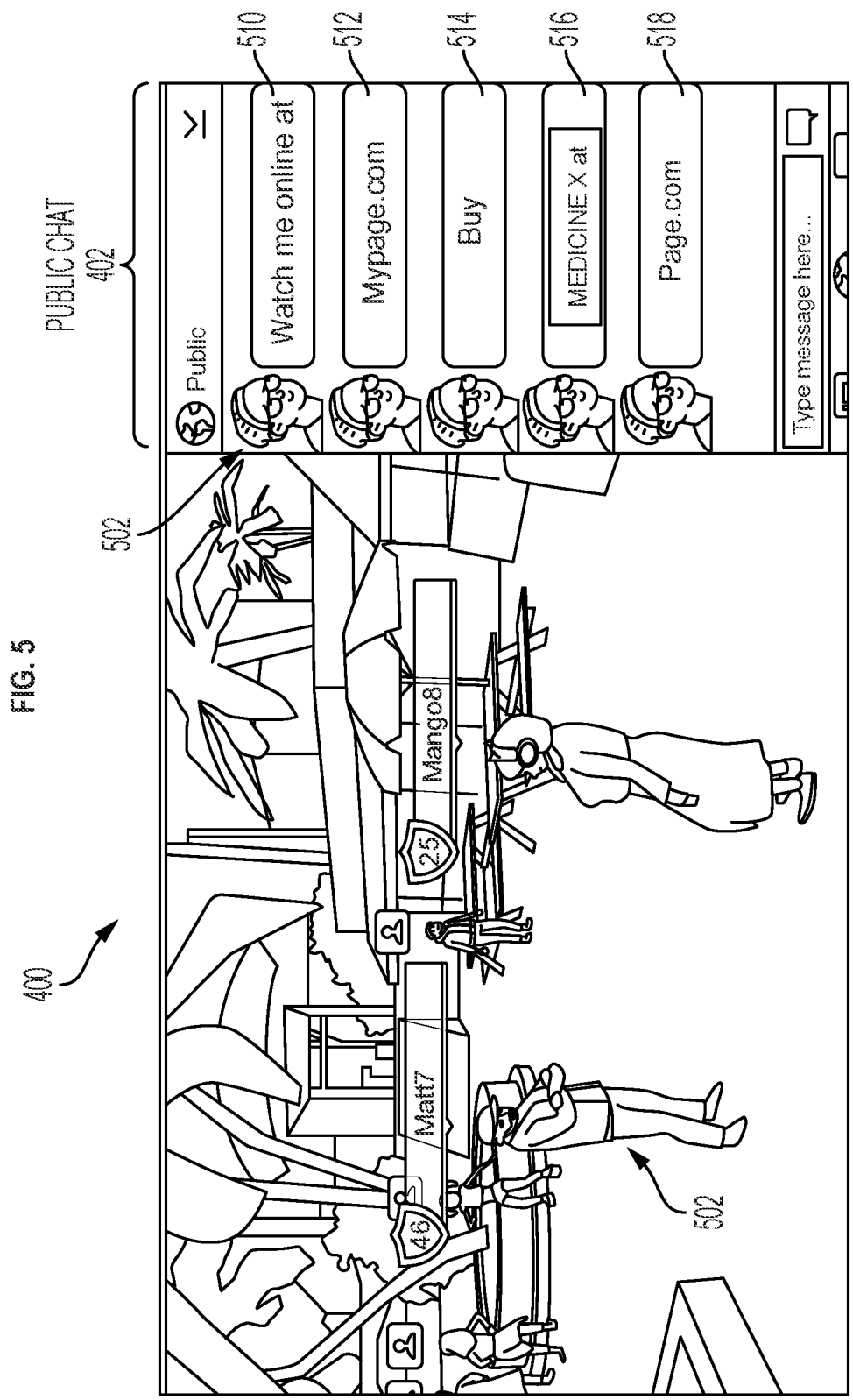
FIG. 5 depicts an example virtual environment in virtual reality with a global or public chat having consecutive segmented messages/phrases in violation of a security rule according to one or more embodiments of the present invention.

Referring to FIG. 3, at block 304, one or more software applications 204 are configured to determine whether a complete message can be constructed from the summation of a set of consecutive segmented messages/phrases in the public chat 402 from a single user and/or from a group of user. The users each have a user account in their respective user profiles 242. Segmented messages and/or phrases are individual parts of a complete message that have been broken up into separate posts in the public chat 402 in order to bypass security features of the virtual reality. Post a message means transferring, sending, publishing, disseminating, or otherwise communicating any message or information for display (e.g., on display 119) in the public chat 402 for other users to see. FIG. 5 depicts the example virtual environment 400 in virtual reality with the global or public chat 402 having a set of consecutive segmented messages/phrases. The software applications 204 are configured to determine that, for example, a set of consecutive segmented messages 510, 512, 514, 516, and 518 form a complete message from the user avatar 502 in FIG. 5. Although the consecutive segmented messages 510, 512, 514, 516, and 518 are each in separate posts (e.g., separate boxes delineating individually uploaded messages) in the public chat 402, the complete message is "Watch me online at mypage.com buy medicine X at page.com." In other words, the software applications 204 are configured to combine the set of consecutive segmented messages 510, 512, 514, 516, and 518 to form the complete message. Individually, the consecutive segmented messages 510, 512, 514, 516, and 518 may bypass security features in a typical system.

In one or more embodiments, the software applications 204 are configured employ, call, and/or include a rules-based algorithm. An example of a rules-based system is a domain-specific expert system that uses rules to make deductions or choices. The rules-based system includes a set of facts or source of data related to capturing objects, and a set of rules for manipulating that data. These rules are sometimes referred to as "If statements" as they tend to follow the line of "IF X happens THEN do Y."

In one or more embodiments, the software applications 204 are configured employ, call, and/or include a cognitive engine, such as a natural language processing (NLP) model 228, to determine if a set of consecutive segmented messages from a given user (or users) is a complete message used to bypass current security features. The NLP model 228 may include and/or start from a pretrained NLP model. A pretrained model is a model that has been trained on a large dataset and can be used as a starting point for other tasks. Examples of a few known pretrained models include bidirectional encoder representations from transformers (BERT), generative pretrained transformer 2 (GPT-2), embeddings from language models (ELMo), transformer-XL, robustly optimized BERT, etc. Additionally, the NLP model 228 can be further trained on training data 206. The training data 206 can include historical data of consecutive segmented messages from various posts, which together form a complete message with the intention to bypass security features. The set of consecutive segmented messages are generally advertisements, marketing, and solicitation messages and may include inappropriate material. The training data 206 of consecutive segmented messages that form a complete message may be labeled accordingly (as either violating the security rules or not violating the security) to improve the training of the NLP algorithm(s) of the NLP model 228. Example machine learning algorithms for NLP may include but are not limited to the following algorithms: support vector machines (SVM), Naive Bayes, logistic regression, decision trees, random forests, K-nearest neighbors, gradient boosting, etc. Example deep machine learning algorithms for NLP may include convolutional neural networks (CNNs), recurrent neural networks (RNNs), long short-term memory (LSTM) networks, transformer networks, gated recurrent units (GRUs), deep belief networks (DBNs), generative adversarial networks (GANs), etc.

Figure 9:
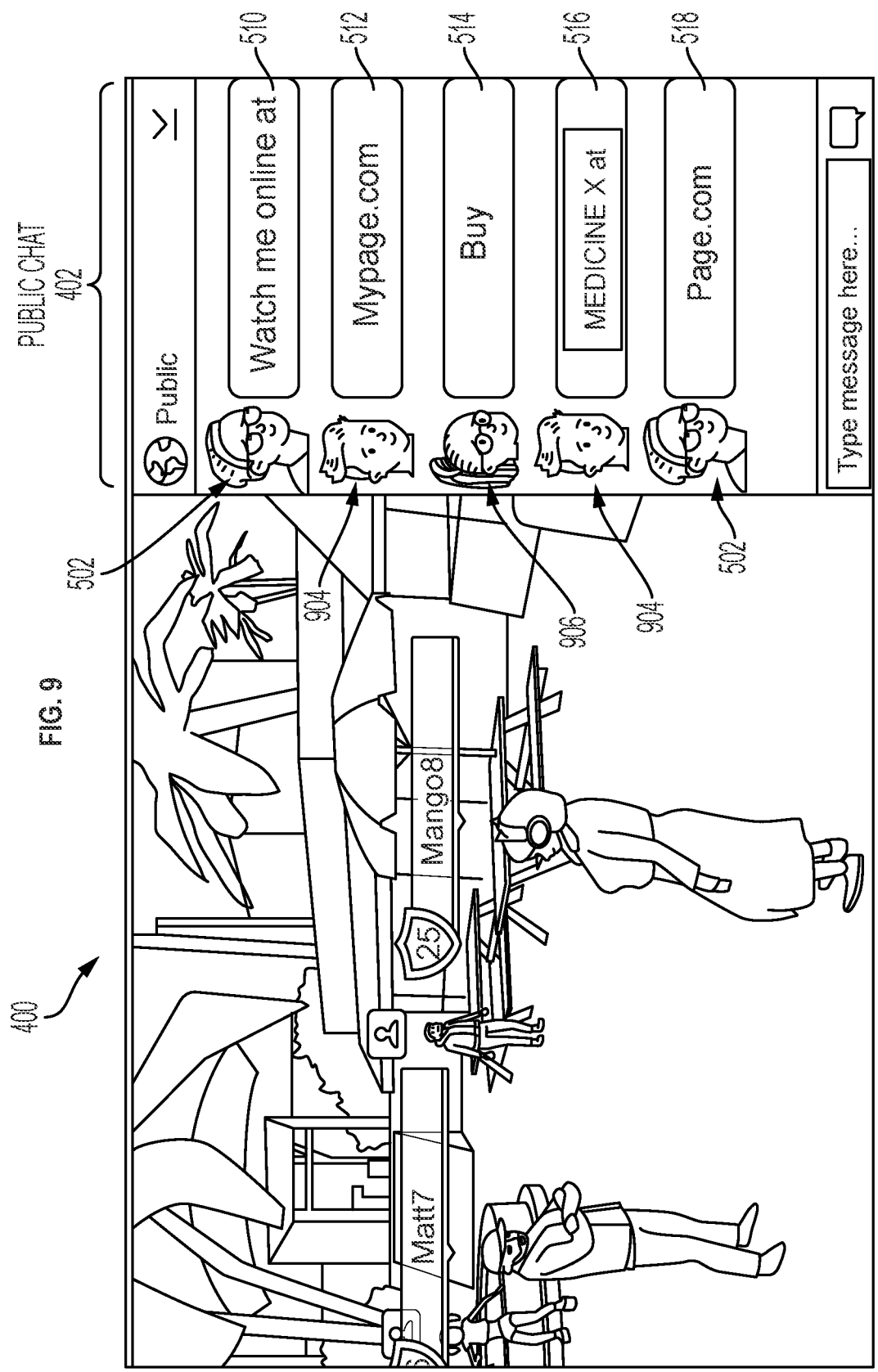
FIG. 9 depicts an example virtual environment in virtual reality with a global or public chat having consecutive segmented messages/phrases from different users intended to bypass a security feature according to one or more embodiments of the present invention.

Referring to FIG. 3, when (No) a complete message is not found in the summation of the consecutive segmented messages, flow returns to block 302 for further monitoring. At block 306, when a complete message is determined in the combination of the consecutive segmented messages (e.g., the consecutive segmented messages 510, 512, 514, 516, and 518), the software applications 204 are configured to extract the complete message from the various posts/blocks in the public chat 402. As noted in the example above, the consecutive segmented messages 510, 512, 514, 516, and 518 result in the extracted complete message "Watch me online at mypage.com buy medicine X at page.com." FIG. 9 illustrates an example in which the set of consecutive segmented messages that are combined to form the complete message are from multiple users 502, 904, and 906 (i.e., more than one user account in the virtual reality is utilized), as an attempt to bypass (deceive) security features. Because the software applications 204 are configured to parse the public chat 402 for a complete message that can be composed of a set of consecutive segmented message, the complete message is still found in the set of consecutive segmented messages 510, 512, 514, 516, and 518 from multiple users 502, 904, and 906 (i.e., multiple user accounts). To avoid the functionality of the public chat 402 from being blocked as a communication channel, the software applications 204 are configured to parse the posts for consecutive posts, because non-consecutive posts would allow other users to enjoy the functionality of the public chat 402. Also, checking consecutive posts prevents a person from evading the security by having multiple user accounts in the user profiles 242.

At block 308, the software applications 204 are configured to compare/correlate the complete message to security rules to determine if the complete message violates any security rules in the database of security rules 232. At block 310, the software applications 204 are configured to check if a match is found between the complete message and the security rules in the database of security rules 232. If (No) the complete message does not violate any security rule, the flow returns to block 302. The blocks 308 and 310, check and determine when the complete message formed of the set of consecutive segmented messages violates or matches the subject matter, semantics, structure, intent, etc., of any one of the security rules 232

At block 312, when (Yes) the complete message is found to violate or match the subject matter, semantics, structure, intent, etc., of any one of the security rules 232, the software applications 204 are configured to check whether the set of consecutive segmented messages are from the same (individual) user or from two more different users.

Figure 6:
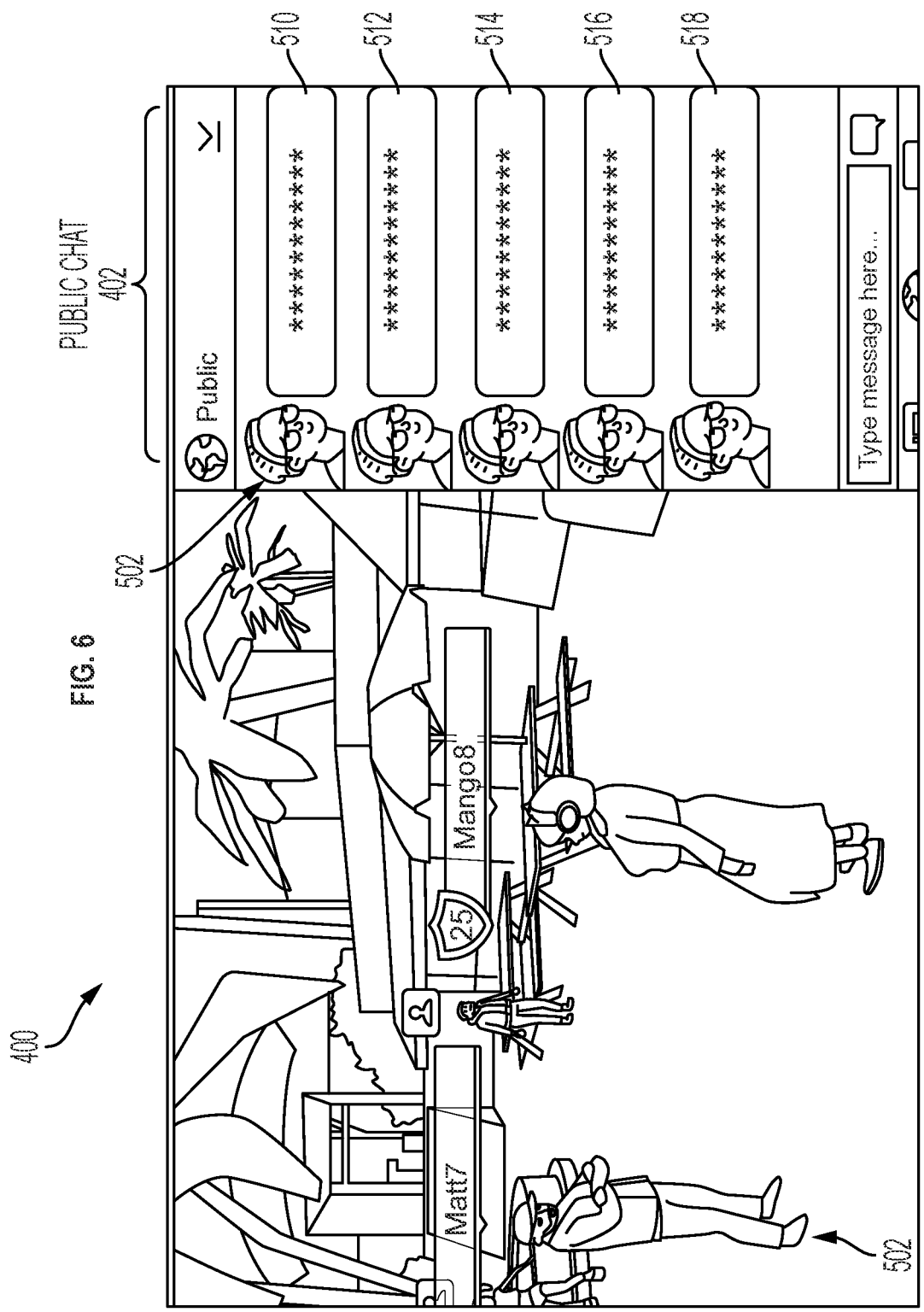
FIG. 6 depicts an example virtual environment in virtual reality with a global or public chat having consecutive segmented messages/phrases obfuscated according to one or more embodiments of the present invention.
Figure 7:
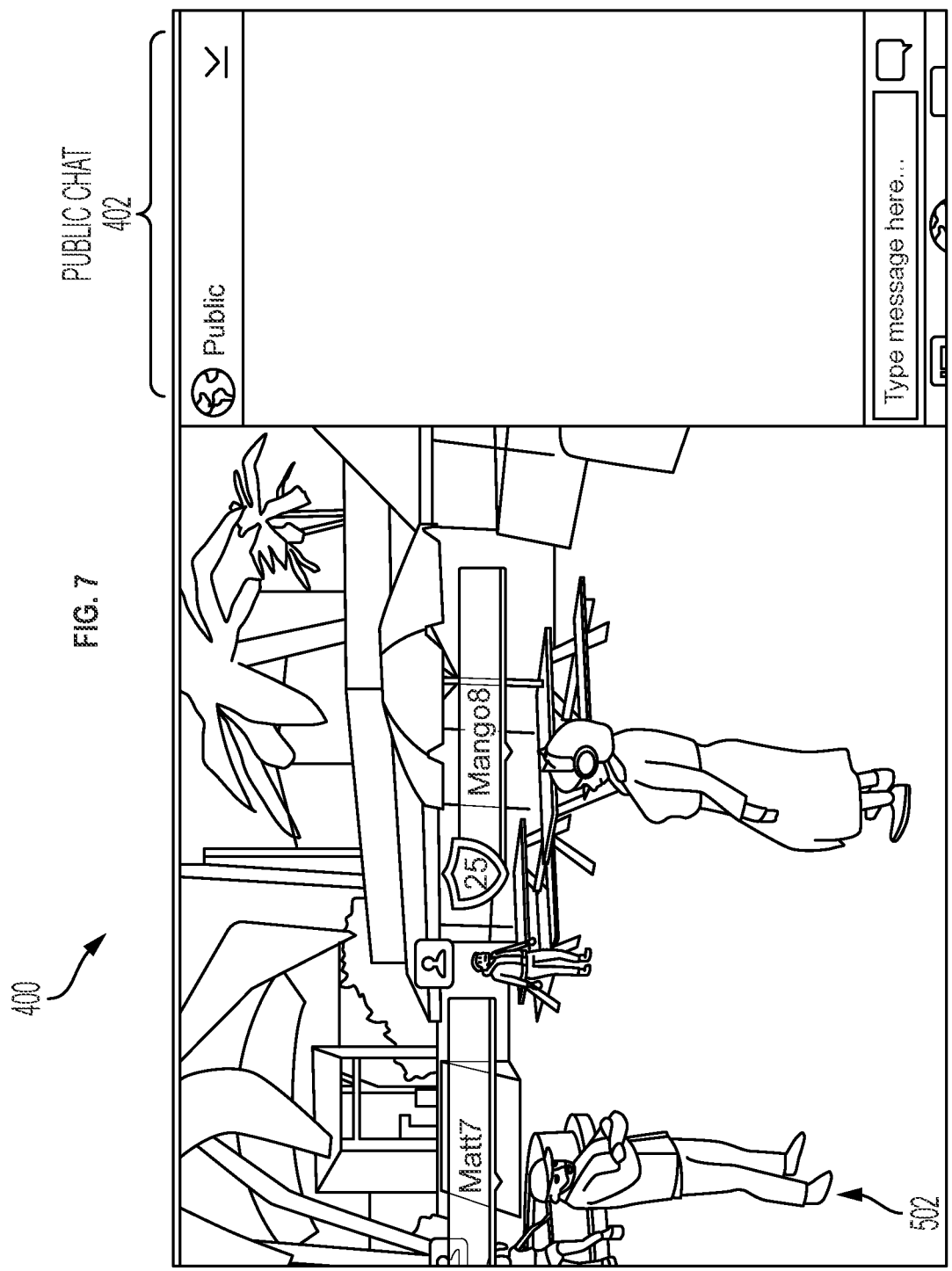
FIG. 7 depicts an example virtual environment in virtual reality with a global or public chat having consecutive segmented messages/phrases deleted according to one or more embodiments of the present invention.
Figure 8:
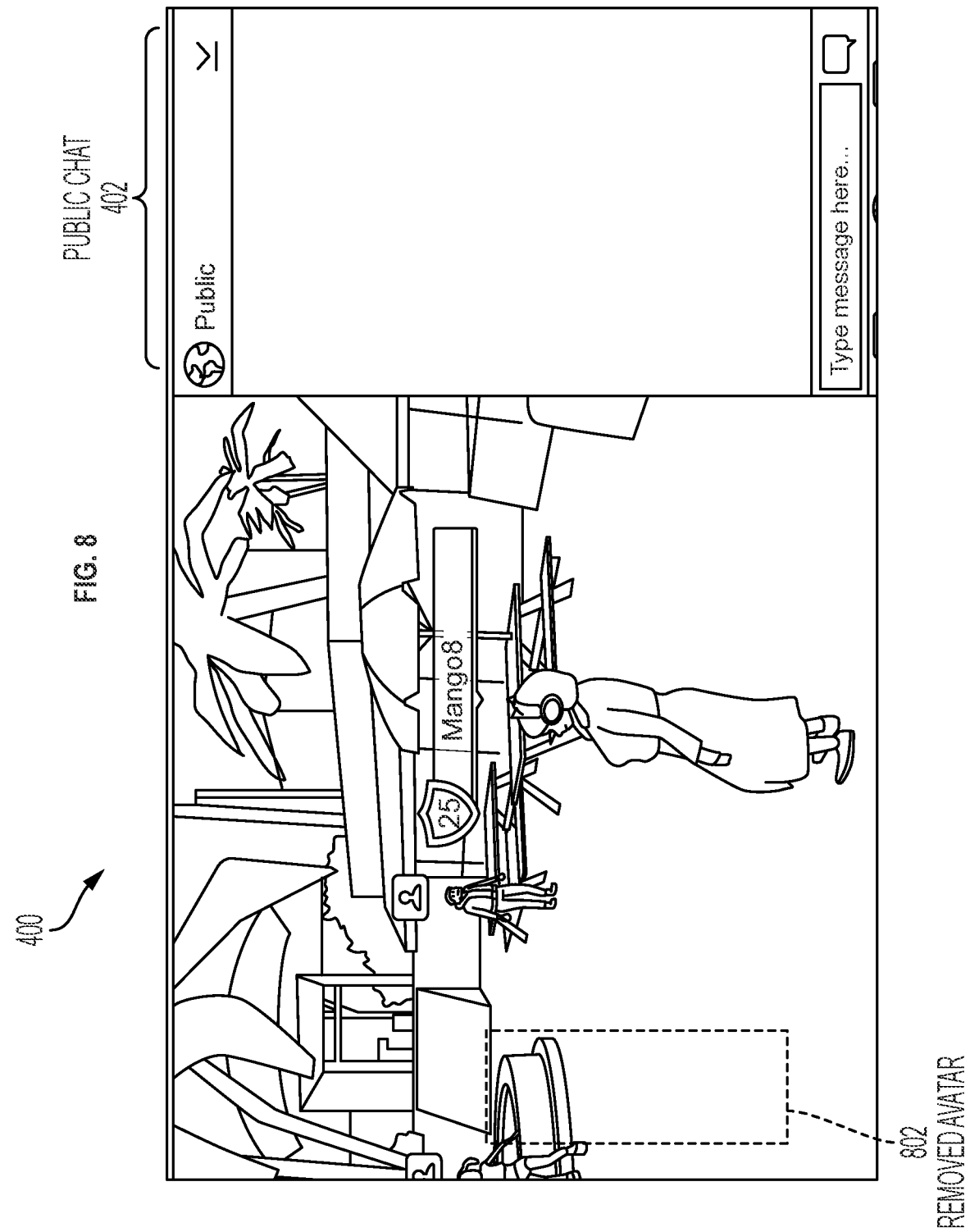
FIG. 8 depicts an example virtual environment in virtual reality with a global or public chat with deletion of consecutive segmented messages/phrases and the corresponding user avatar according to one or more embodiments of the present invention.

At blocks 314 and 316, the software applications 204 are configured to automatically execute security actions on the individual user (e.g., a single user account depicted in FIG. 5) and/or the two or more users (e.g., different user accounts depicted in FIG. 9) who posted the segmented messages that can be combined to form the complete message. The security actions to perform toward the one or more users can be selected from a database of security actions 230. The security actions can escalate based on, for example, the severity of the violation, the number of violations (e.g., has the user account(s) been previously warned), and/or the offensiveness of the subject matter. The software applications 204 are configured to perform security actions of text obfuscation as depicted in FIG. 6, preventing display of the message as depicted in FIG. 7, and user avatar obfuscation as depicted in FIG. 8. As seen in FIG. 6, text obfuscation shows that the user sent a message, but the content of the message is obfuscated. By obscuring the consecutive segmented messages 510, 512, 514, 516, and 518 in the public chat 402, the software applications 204 deter the user(s) 502 from violating the security policies as depicted in FIG. 6. FIG. 6 shows that the user 502 is a single user, but the security actions apply to different users, which are different user accounts utilized in concert to form the complete message in the virtual reality.

By preventing display of the message, no consecutive segmented messages of the complete message are displayed in the public chat 402 as depicted in FIG. 7. In FIG. 7, both the image and his/her corresponding consecutive segmented messages have been completely removed and/or blocked from display in the public chat 402. In cases where two or more users were determined to have a set of consecutive segmented messages forming the complete message, the software applications 204 remove both the images and the consecutive segmented messages from the public chat 402.

Additionally, by user obfuscation, the user avatar in the virtual world is not visible to other users in the virtual world of the virtual environment 400 as depicted in FIG. 8. Not only are the image and his/her corresponding consecutive segmented messages removed from the public chat 402 (as depicted in FIG. 7), but FIG. 8 further shows that the user avatar, previously shown as user avatar 502 in FIG. 7, has been removed from the virtual world of the virtual environment 400 and now a blank space 802 remains at user avatar's previous location.

In addition to the security actions of text obfuscation in FIG. 6, preventing display of the complete message in FIG. 7, and user obfuscation of the user avatar and preventing display of the complete message in FIG. 8, further security actions may include locking the user account(s) having posted the consecutive segmented messages, requesting multifactor authentication (MFA) for the user account(s), deleting the user messages of the user account(s), and/or requesting the user account(s) to perform a given action (e.g., to confirm the user is not a bot).

In one or more embodiments, the software applications 204 may include, employ, and/or call a rules-based algorithm 224 to compare the complete message to one or more security rules in the database of the security rules 232 and to determine when a match/violation is found in blocks 308 and 310. When analyzing potential violations of the security rules for the public chat 402 of the virtual environment 400, the security rules 232 relate to the structure of and define advertisements, marketing schemes and materials, solicitations, products for sale, services for sales, information about websites for purchasing products and services, telephone numbers for purchasing products and services, financial technology (FinTech) for transactions to purchase products and services (including known payment methods such as mobile banking platforms, peer-to-peer payment services, etc.), etc. The software applications 204 may use the rules-based algorithm 224 to determine when the complete message fits the structure and/or includes the subject matter (e.g., advertisements, marketing, and solicitations, etc.) that violates the security rules 232.

In one or more embodiments, the software applications 204 may include, employ, and/or call machine learning models 220 to compare the complete message to one or more security rules in the database of the security rules 232 and to determine when a match/violation is found in blocks 308 and 310. The machine learning model 220 has been trained to classify the complete sentence as violating the security rules or not violating the security rules. The extracted complete sentence is input to the machine learning model 220, and the machine learning model 220 classifies the complete sentence by predicting a label that identifies the extracted complete sentence as violating the security rules or not violating the security rules.

During the training phase, the machine learning model 220 is trained on training data 208. The training data 208 can include complete sentences, each labeled as violating the security rules or not violating the security rules. The training data 208 may also include historical data from public chats 402, in which the historical data includes numerous complete messages formed by combining respective sets of consecutive segmented messages, and the compete messages have been labeled. For example, an actual complete message formed of a set of consecutive segmented messages can be retrieved from the public chat 402 in which the complete message violated the security rules, and such complete messages are utilized as training data 208. Additionally, the complete message may not be grammatically correct because the user is attempting to evade the security features, but each successive segmented message in the set of the consecutive segmented messages contains a piece of information that helps the reader to understand the meaning of the complete message; accordingly, the machine learning model 220 is trained on this unorthodox training data. Further, the training data 208 may include normal consecutive segmented messages that are not intended to violate the security rules, and these normal consecutive segmented messages can be combined into a normal message and labeled as not violating the security rules; as such, the machine learning model 220 is trained on this training data. The algorithm of the machine learning model 220 is trained to learn how to classify the complete sentences as violating the security rules or not violating the security rules, thereby resulting in a trained machine learning model with set weights and parameters.

Example algorithms for the machine learning model 220 may include but are not limited to a decision tree, Naïve Bayes classifier, k-nearest neighbors, support vector machines, artificial neural networks, etc., as understood by one of ordinary skill in the art. Other example algorithms for the machine learning model 220 may include but are not limited to linear discriminant analysis (LDA), least squares, ridge regression, Lasso, elastic net, least angle regression, orthogonal matching pursuit, Bayesian regression, logistic regression, linear regression, perception algorithms, passive aggressive classifier, etc., as understood by one of ordinary skill in the art.

Figure 10:
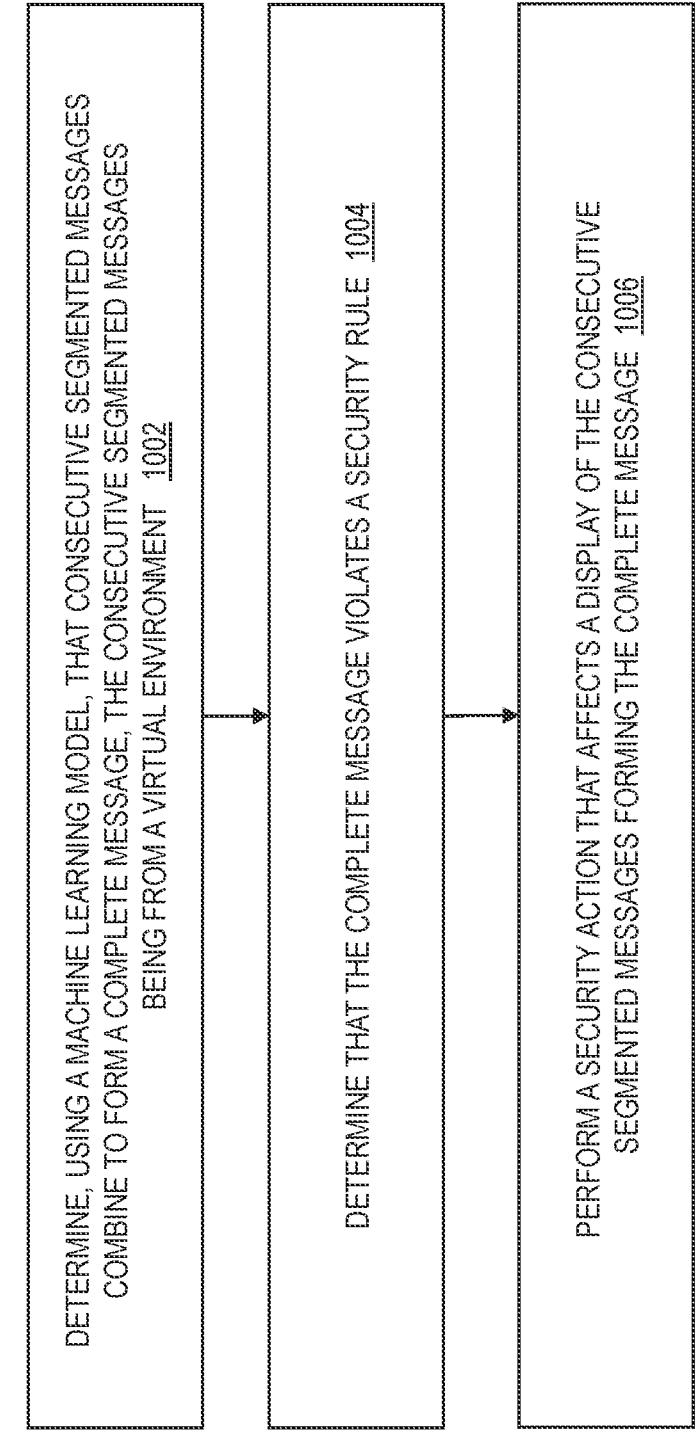
FIG. 10 is a flowchart of a computer-implemented method for automatic curation of chats in virtual reality in order to determine a message that violates security rules and for automatically performing security actions based on the violation according to one or more embodiments of the present invention.

FIG. 10 is a flowchart of a computer-implemented method 1000 for automatic curation of chats in virtual reality in order to determine a message that violates security rules and for automatically performing automatic security actions based on the violation according to one or more embodiments, according to one or more embodiments. The computer-implemented method 1000 can be executed by the computer system 202. Reference can be made to any of the figures discussed herein.

At block 1002, the software applications 204 on computer system 202 are configured to determine, using a machine learning model (e.g., the NLP model 228), that consecutive segmented messages combine to form a complete message, the consecutive segmented messages being from a virtual environment 400. At block 1004, the software applications 204 are configured to determine that the complete message violates a security rule. At block 1006, the software applications 204 are configured to perform a security action and/or cause a security action to be performed that affects a display (e.g., in the virtual environment 400 on display 119) of the consecutive segmented messages forming the complete message.

In one or more embodiments, the machine learning model is a natural language processing (NLP) model 228. The consecutive segmented messages (e.g., consecutive segmented messages 510, 512, 514, 516, and 518) forming the complete message are separate posts in a communication channel (e.g., public chat 402) for the virtual environment 400.

In one or more embodiments, a rules-based algorithm 224 is used to determine that the complete message violates the security rule (e.g., in the database of security rules 232). Another machine learning model 220 is used to determine that the complete message violates the security rule, the another machine learning model 220 being trained on training data (e.g., training data 208) including a plurality of complete messages (each formed as a summation of their respective sets of consecutive segmented messages) that violate the security rule.

The software applications 204 are configured to determine whether the security violation of the security rule is by one or more user accounts (e.g., in user profiles 242) that posted the consecutive segmented messages forming the complete message, and to perform the security action on each of the one or more user accounts (e.g., in user profiles 242) that posted the consecutive segmented messages forming the complete message. The security action protects a functionality of a communication channel (e.g., the public chat 402) in the virtual environment 400 generated by one or more computer systems 202.

In one or more embodiments, the machine learning models 220 and/or the NLP model 228 can include various engines/classifiers and/or can be implemented on a neural network. The features of the engines/classifiers can be implemented by configuring and arranging the computer system 202 to execute machine learning algorithms. In general, machine learning algorithms, in effect, extract features from received data (e.g., the complete message formed of segmented messages) in order to "classify" the received data. Examples of suitable classifiers include but are not limited to neural networks, support vector machines (SVMs), logistic regression, decision trees, hidden Markov Models (HMMs), etc. The end result of the classifier's operations, i.e., the "classification," is to predict a class (or label) for the data. The machine learning algorithms apply machine learning techniques to the received data in order to, over time, create/train/update a unique "model." The learning or training performed by the engines/classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In one or more embodiments, the engines/classifiers are implemented as neural networks (or artificial neural networks), which use a connection (synapse) between a pre-neuron and a post-neuron, thus representing the connection weight. Neuromorphic systems are interconnected elements that act as simulated "neurons" and exchange "messages" between each other. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. After being weighted and transformed by a function (i.e., transfer function) determined by the network's designer, the activations of these input neurons are then passed to other downstream neurons, which are often referred to as "hidden" neurons. This process is repeated until an output neuron is activated. Thus, the activated output neuron determines (or "learns") and provides an output or inference regarding the input.

Training datasets (e.g., training data 206 and training data 208) can be utilized to train the machine learning algorithms. The training datasets can include historical data of past tickets and the corresponding options/suggestions/resolutions provided for the respective tickets. Labels of options/suggestions can be applied to respective tickets to train the machine learning algorithms, as part of supervised learning. For the preprocessing, the raw training datasets may be collected and sorted manually. The sorted dataset may be labeled (e.g., using the Amazon Web Services® (AWS®) labeling tool such as Amazon SageMaker® Ground Truth). The training dataset may be divided into training, testing, and validation datasets. Training and validation datasets are used for training and evaluation, while the testing dataset is used after training to test the machine learning model on an unseen dataset. The training dataset may be processed through different data augmentation techniques. Training takes the labeled datasets, base networks, loss functions, and hyperparameters, and once these are all created and compiled, the training of the neural network occurs to eventually result in the trained machine learning model (e.g., trained machine learning algorithms). Once the model is trained, the model (including the adjusted weights) is saved to a file for deployment and/or further testing on the test dataset.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
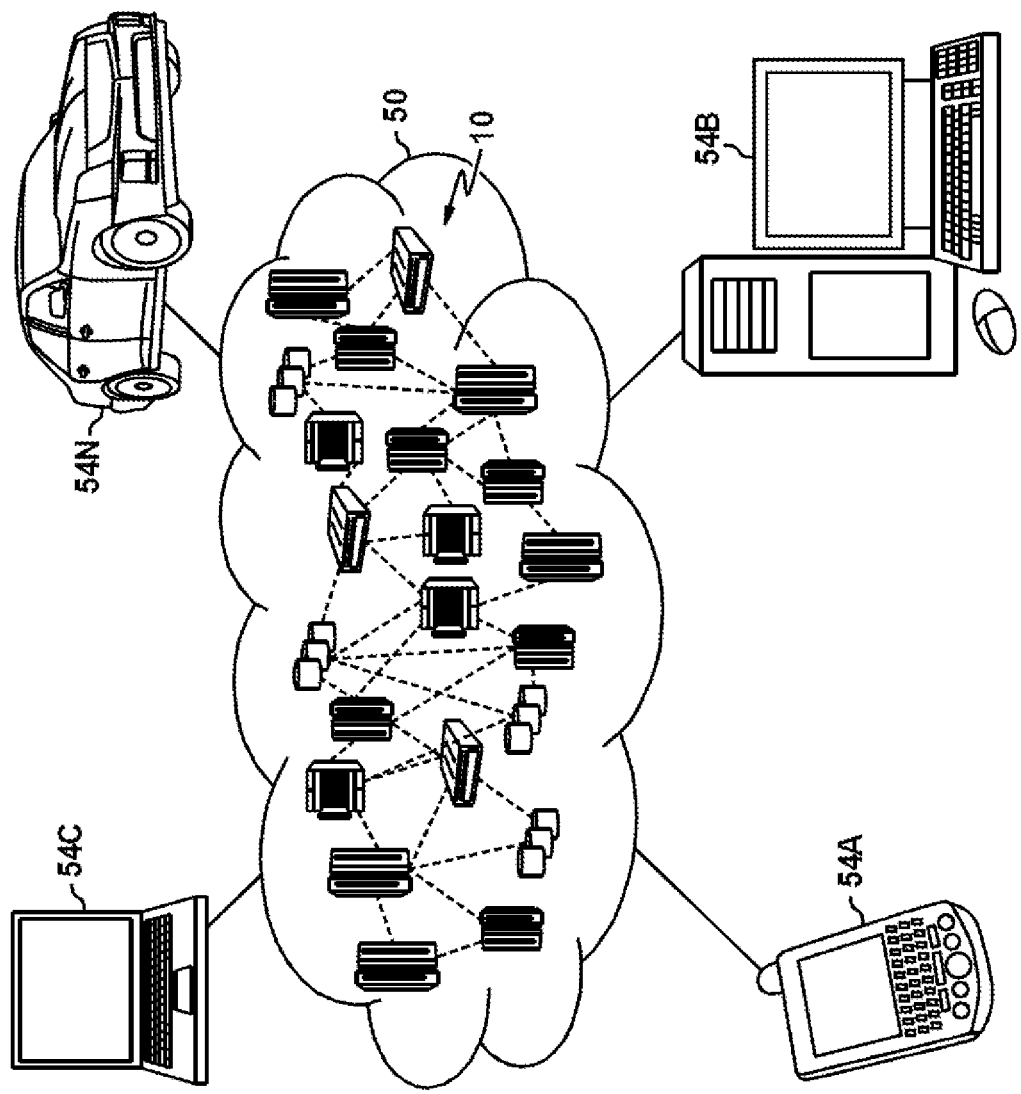
FIG. 11 depicts a cloud computing environment according to one or more embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
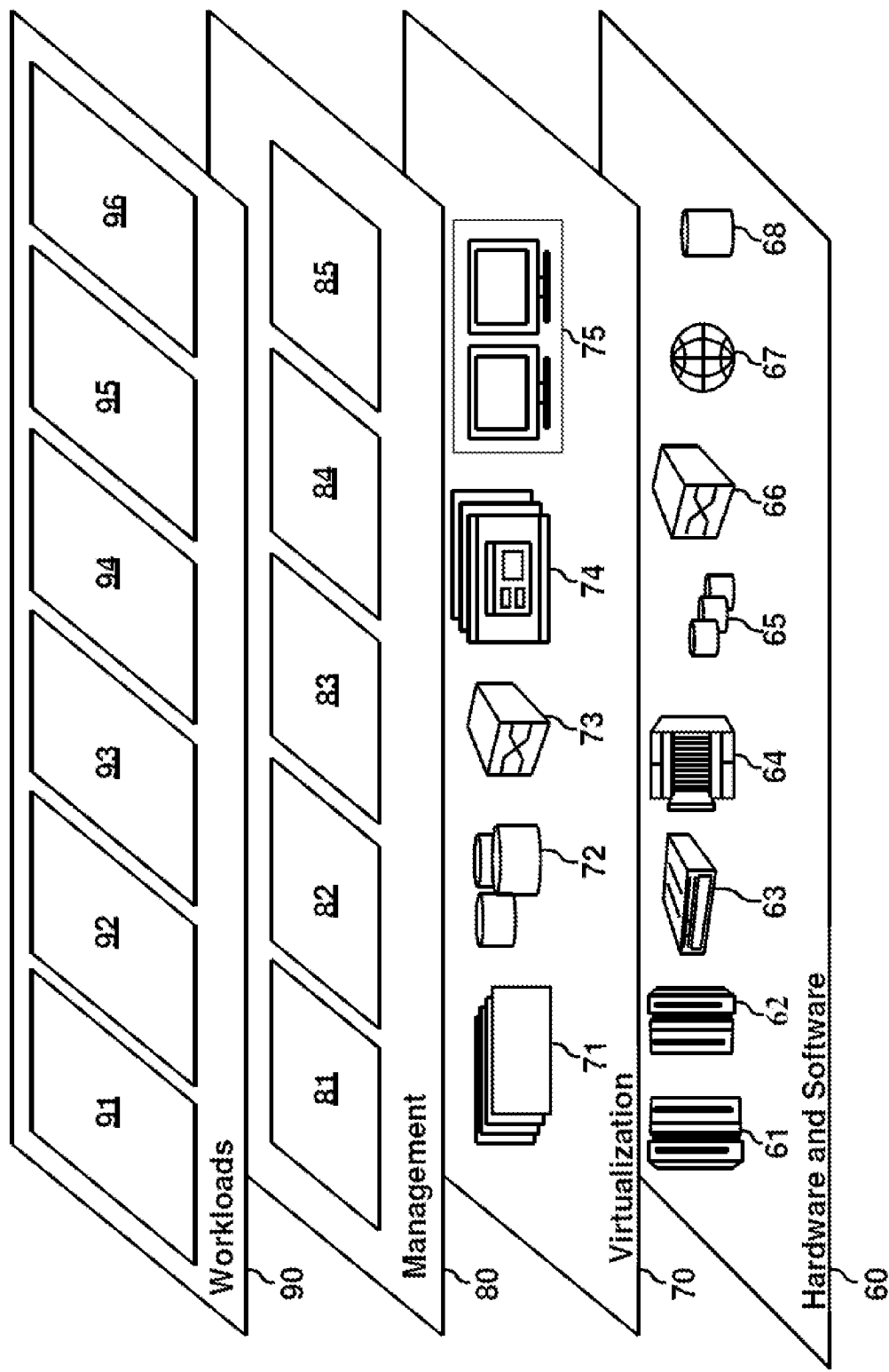
FIG. 12 depicts abstraction model layers according to one or more embodiments of the present invention.

Referring now to FIG. 12, a set of functional abstraction layers provided by cloud computing environment 50 (depicted in FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for performing security in a virtual environment, the method comprising:
    generating, by at least one processor, a virtual environment configured to provide a virtual reality, wherein the virtual environment provides connectivity to a user device;
    inputting, by the at least one processor to a machine learning model, consecutive segmented messages received from the user device communicating in the virtual environment in which the consecutive segmented messages combine to form a complete message that is displayed in the virtual environment, the consecutive segmented messages being from an avatar in the virtual environment, wherein the consecutive segmented messages forming the complete message are separate posts by the avatar in the virtual environment intended to bypass a security rule, wherein an individual one of the separate posts of the consecutive segmented messages from the avatar does not violate the security rule;
    detecting that a combination of the consecutive segmented messages of the separate posts forms the complete message that violates the security rule using the machine learning model, wherein the machine learning model is trained to classify the complete message as violating or not violating the security rule, the machine learning model being trained on data comprising a plurality of complete messages formed by combining respective sets of consecutive segmented messages, the plurality of compete messages being labeled as violating or not violating the security rule;
    in response to detecting the violation of the security rule, changing the virtual environment to obfuscate a display of the consecutive segmented messages forming the complete message such that a view of the complete message is no longer displayed in the virtual environment; and
    in response to the violation of the security rule being by one or more user accounts that posted the consecutive segmented messages forming the complete message, changing the virtual environment to obfuscate each of the one or more user accounts that posted the consecutive segmented messages forming the complete message.

2. The computer-implemented method of claim 1, wherein the machine learning model is a natural language processing (NLP) model.

3. The computer-implemented method of claim 1, wherein at least one of the separates posts of the consecutive segmented messages is displayed in the virtual environment to be posted by a different avatar to bypass the security rule.

4. The computer-implemented method of claim 1, wherein a rules-based algorithm is used to determine that the complete message violates the security rule.

5. The computer-implemented method of claim 1, wherein another machine learning model is used to determine that the complete message violates the security rule, the another machine learning model being trained on training data comprising a plurality of complete messages that violate the security rule.

6. The computer-implemented method of claim 1, wherein a security action is executed that protects a functionality of a communication channel in the virtual environment and removes an image of the avatar from being displayed in the virtual environment.

7. A system comprising:
    a memory having computer readable instructions for performing security in a virtual environment; and
    one or more processors for executing the computer readable instructions, the computer readable instructions controlling the one or more processors to perform operations comprising:
        generating, by the one or more processors, a virtual environment configured to provide a virtual reality, wherein the virtual environment provides connectivity to a user device;
    inputting by the one or more processors to a machine learning model, consecutive segmented messages received from a user device communicating in the virtual environment in which the consecutive segmented messages combine to form a complete message that is displayed in the virtual environment, the consecutive segmented messages being from an avatar in the virtual environment, wherein the consecutive segmented messages forming the complete message are separate posts by the avatar in the virtual environment intended to bypass a security rule, wherein an individual one of the separate posts of the consecutive segmented messages from the avatar does not violate the security rule;
        detecting that a combination of the consecutive segmented messages of the separate posts forms the complete message that violates the security rule using the machine learning model, wherein the machine learning model is trained to classify the complete message as violating or not violating the security rule, the machine learning model being trained on data comprising a plurality of complete messages formed by combining respective sets of consecutive segmented messages, the plurality of compete messages being labeled as violating or not violating the security rule;
        in response to detecting the violation of the security rule, changing the virtual environment to obfuscate a display of the consecutive segmented messages forming the complete message such that a view of the complete message is no longer displayed in the virtual environment; and
        in response to the violation of the security rule being by one or more user accounts that posted the consecutive segmented messages forming the complete message, changing the virtual environment to obfuscate each of the one or more user accounts that posted the consecutive segmented messages forming the complete message.

8. The system of claim 7, wherein the machine learning model is a natural language processing (NLP) model.

9. The system of claim 7, wherein at least one of the separates posts of the consecutive segmented messages is displayed in the virtual environment to be posted by a different avatar to bypass the security rule.

10. The system of claim 7, wherein a rules-based algorithm is used to determine that the complete message violates the security rule.

11. The system of claim 7, wherein another machine learning model is used to determine that the complete message violates the security rule, the another machine learning model being trained on training data comprising a plurality of complete messages that violate the security rule.

12. The system of claim 7, wherein a security action is executed that protects a functionality of a communication channel in the virtual environment.

13. A computer program product comprising a computer readable storage medium having program instructions embodied therewith for performing security in a virtual environment, the program instructions executable by one or more processors to cause the one or more processors to perform operations comprising:
- generating, by at least one processor, a virtual environment configured to provide a virtual reality, wherein the virtual environment provides connectivity to a user device;
- inputting, by the at least one processor to a machine learning model, consecutive segmented messages received from the user device communicating in the virtual environment in which the consecutive segmented messages combine to form a complete message that is displayed in the virtual environment, the consecutive segmented messages being from an avatar in the virtual environment, wherein the consecutive segmented messages forming the complete message are separate posts by the avatar in the virtual environment intended to bypass a security rule, wherein an individual one of the separate posts of the consecutive segmented messages from the avatar does not violate the security rule;
- detecting that a combination of the consecutive segmented messages of the separate posts forms the complete message that violates the security rule using the machine learning model, wherein the machine learning model is trained to classify the complete message as violating or not violating the security rule, the machine learning model being trained on data comprising a plurality of complete messages formed by combining respective sets of consecutive segmented messages, the plurality of compete messages being labeled as violating or not violating the security rule;
- in response to detecting the violation of the security rule, changing the virtual environment to obfuscate a display of the consecutive segmented messages forming the complete message such that a view of the complete message is no longer displayed in the virtual environment; and
- in response to the violation of the security rule being by one or more user accounts that posted the consecutive segmented messages forming the complete message, changing the virtual environment to obfuscate each of the one or more user accounts that posted the consecutive segmented messages forming the complete message.

14. The computer program product of claim 13, wherein the machine learning model is a natural language processing (NLP) model.

15. The computer program product of claim 13, wherein at least one of the separates posts of the consecutive segmented messages is displayed in the virtual environment to be posted by a different avatar to bypass the security rule.

16. The computer program product of claim 13, wherein a rules-based algorithm is used to determine that the complete message violates the security rule.

17. The computer program product of claim 13, wherein another machine learning model is used to determine that the complete message violates the security rule, the another machine learning model being trained on training data comprising a plurality of complete messages that violate the security rule.

* * * * *